US010238228B2

(12) United States Patent
Barberi (10) Patent No.: US 10,238,228 B2
(45) Date of Patent: Mar. 26, 2019

(54) COMPOSITE COOKWARE HANDLE (71) Applicant: Meyer Intellectual Properties Limited, Kowloon, Hong Kong (CN)

(72) Inventor: Phillip D. Barberi, Vallejo, CA (US)

(73) Assignee: Meyer Intellectual Properties Limited (VG)

( * ) Notice: Subject to any disclaimer, the term of this patent is extended or adjusted under 35 U.S.C. 154(b) by 0 days.

(21) Appl. No.: 15/433,700

(22) Filed: Feb. 15, 2017

(65) Prior Publication Data
US 2017/0231416 A1 Aug. 17, 2017

Related U.S. Application Data (60) Provisional application No. 62/295,642, filed on Feb. 16, 2016.

(51) Int. Cl.
*A47J 27/00* (2006.01)
*A47J 45/06* (2006.01)

(52) U.S. Cl.
CPC .......... *A47J 27/002* (2013.01); *A47J 45/061* (2013.01); *A47J 45/062* (2013.01)

(58) Field of Classification Search
CPC ......... A47J 27/002; A47J 45/00–45/10; B65D 23/10–23/16; B65D 2525/28–2525/289
USPC ........................... 220/573.1–573.5, 752–776; 16/110.1–430
See application file for complete search history.

(56) References Cited

U.S. PATENT DOCUMENTS

| 1,490,568 | A | * | 4/1924 | Remus | A47J 45/061 16/429 |
| 2,361,417 | A | * | 10/1944 | Reichart | B25B 1/205 220/758 |
| 6,173,860 | B1 | * | 1/2001 | Lamers | A47J 45/061 220/573.1 |
| 6,257,439 | B1 | * | 7/2001 | Hsu | A47J 45/061 16/425 |

(Continued)

FOREIGN PATENT DOCUMENTS

| CN | 201701047 U | 1/2011 |
| CN | 201899399 U | 7/2011 |

(Continued)

OTHER PUBLICATIONS

First Notification to Make Rectification issued by SIPO dated Jan. 4, 2018 in connection with corresponding PRC Application No. 201720141038X.

(Continued)

*Primary Examiner* — Kareen Thomas
(74) *Attorney, Agent, or Firm* — Akerman LLP (57) ABSTRACT A cookware handle includes a plastic grip portion molded over a portion of an insert. The insert inserts into a bore of a flange. The grip portion is externally flush with the flange interface and the insert internally connects the grip portion to the flange. This allows the grip portion to be over molded on a first part of the insert so the other portion can be welded or otherwise attached to the flange after external surface finishing of the flange. The insert and flange may be welded together along a portion of the insert that contacts the flange within the bore and that is not visible when the flange is attached to a cookware vessel sidewall to provide the grip molded as a handle for the cookware vessel.

14 Claims, 9 Drawing Sheets (56) References Cited

U.S. PATENT DOCUMENTS

| | | | |
|---|---|---|---|
| 7,624,893 B2 | 12/2009 | Hoff et al. | |
| 8,857,657 B2* | 10/2014 | Rae | A47J 37/10 16/425 |
| 8,950,621 B2* | 2/2015 | Hinzman | A47J 45/06 220/573.1 |
| 9,155,426 B2* | 10/2015 | Corbin | A47J 45/10 |
| 9,492,034 B2* | 11/2016 | Pan | A47J 45/061 |
| 2008/0290104 A1* | 11/2008 | Ng | A47J 45/061 220/753 |
| 2012/0217252 A1* | 8/2012 | Jung | A47J 27/002 220/573.4 |
| 2013/0161335 A1* | 6/2013 | Rae | A47J 37/10 220/573.1 |

FOREIGN PATENT DOCUMENTS

| | | |
|---|---|---|
| CN | 207492686 U | 6/2018 |
| DE | 4411550 C1 | 6/1995 |

OTHER PUBLICATIONS

International Search Report issued in connection with corresponding PCT Application No. PCT/US2017/018075.

Written Opinion of the International Search Authority issued in connection with corresponding PCT Application No. PCT/US2017/018075.

Notification of First Office Action issued by SIPO dated Sep. 4, 2018 in connection with corresponding PRC Application No. 2017100847613.

Search Report issued by SIPO dated Aug. 27, 2018 in connection with corresponding PRC Application No. 2017100847613.

\* cited by examiner

COMPOSITE COOKWARE HANDLE

CROSS-REFERENCE TO RELATED APPLICATIONS

This patent application claims the benefit of the filing date under 35 U.S.C. § 119(e) to U.S. Provisional Patent Application No. 62/295,642, filed on Feb. 16, 2016, the contents of which are hereby incorporated by reference in their entirety.

TECHNICAL FIELD

This disclosure relates generally to handles for cookware articles, such as cookware vessels and lids, and methods of making and attaching the same.

BACKGROUND

Cookware articles often include handles to allow a user to move and manipulate the article. Cookware handles are known to employ a metal flange, which attaches to the cookware article, combined with a non-metallic, such as plastic or rubber, grip portion that extends away from the flange and that is intended for a user to grasp. The grip can be over molded on a portion of the flange that is not intended to be visible. Such grips are used as it is usually more comfortable and cooler to touch than a bare metal handle and may assist in reducing the handle weight.

SUMMARY

In one aspect, a handle assembly for a cookware article includes a metal flange, an insert, and a grip member. The metal flange may have an inner face and an outer face. The inner face may be adapted for contacting a curved outer wall of a cookware article. A bore may extend from the outer face toward the inner face and define at least a first cavity therebetween. The insert may have a proximal end and a distal end. The proximal end may be adapted to be received within the first cavity of the bore and secured therein when the proximal end is affixed to the flange within the bore. The grip member may extend between a proximal end and a distal end and comprise a polymeric material over molded at least a portion of the distal end of the insert. The grip member may have an external surface contour at a proximal end that is adapted to be flush with an adjacent portion of the flange when the proximal end of the insert is secured in the first cavity.

In various embodiments, the proximal end of the insert has a metal tab portion having a cross-section dimension complementary to a cross-section dimension of the bore. The metal tab portion may engage the bore along the corresponding complementary cross-section dimension of the bore when received therein. The proximal end may be affixed to the flange along the engaged interface of the metal tab portion and the bore by a weld. In one configuration, the bore defines a channel extending proximally from the first cavity toward the inner face of the flange. The channel may have at least one cross-section dimension smaller than a cross-section dimension of the first cavity. The complementary cross-section dimension of the bore may be located along the channel.

In some embodiments, the bore may extend from the outer face to the inner face of the flange. The first cavity may be adjacent to the outer face and the bore may define a second cavity adjacent to the inner face. In one configuration, the proximal end of the insert comprises a metal tab portion that extends at least partially into the second cavity. The metal tab portion may be affixed to a portion of the bore defining the second cavity by a weld.

In certain embodiments, the bore defines a channel extending between the first cavity and a second cavity. The channel may have at least one cross-section dimension smaller than a cross-section dimension of the first cavity. In one configuration, a length of the proximal end of the insert is adapted to fill at least a portion of a length of the channel when the proximal end of the insert is secured within the first cavity. In this or another configuration, a length of the proximal end of the insert and a length of the channel comprise complementary cross-sections such that the length of the proximal end of the insert fills the length of the channel when the proximal end of the insert is secured with the first cavity. In any of the above or another configuration, the proximal end of the insert comprises a metal tab portion, a flared wedge portion, and a distal portion. The metal tab portion may have at least one cross-section dimension complementary to a cross-section dimension of the channel. The flared wedge portion may be distal of the metal tab portion and have a distally decreasing cross-section adapted to complement a distally decreasing cross-section of the first cavity along a corresponding length of the bore when the proximal end of the insert is secured in the first cavity. The distal portion may be distal of the flared wedge portion. The distally decreasing cross-section along the flared wedge portion may have a cross-section dimension less than the flared wedge portion along the distally decreasing cross-section. The distal portion may be spaced apart from surrounding portions of the bore that define the first cavity when the proximal end is secured therein.

In one embodiment, when the proximal end of the insert is secured in the first cavity, a length of the proximal end within the first cavity is spaced apart from the surrounding portions of the flange that define the first cavity.

In various embodiments, a proximal length of the distal end of the insert defines a cavity adapted to receive a distal length of the proximal end of the insert. The outer face of the flange may include mating structures adapted to mate with mating structures disposed along the proximal length of the distal end of the insert. The proximal end of the insert may be compressed between the flange and the distal end of the insert when the proximal end of the insert is secured in the first cavity. The mating structures disposed along the proximal length of the distal end of the insert may be proximal of the grip member. The mating structures may include threads adapted for screwing the distal end of the insert to the distal face of the flange. The distal end of the insert may further define a cavity along a distal portion thereof. The handle assembly may further include a cap closure having mating structures adapted to mate with mating structures disposed along the distal portion of the distal end of the insert to enclose the cavity.

In another aspect, a cookware vessel includes a vessel having a bottom and a surrounding sidewall that extends upward to form a rim and define an internal volume for receiving and retaining fluid between the bottom and the surrounding sidewall. A handle assembly may be attached to an external portion of the surrounding sidewall at the flange thereof. The handle assembly may include a metal flange, an insert, and a grip member. The metal flange may have an inner face and an outer face. The inner face may be adapted for contacting a curved outer wall of a cookware article. A bore may extend from the outer face toward the inner face and define at least a first cavity therebetween. The insert may have a proximal end and a distal end. The proximal end may be adapted to be received within the first cavity of the bore and secured therein when the proximal end is affixed to the flange within the bore. The grip member may extend between a proximal end and a distal end and comprise a polymeric material over molded at least a portion of the distal end of the insert. The grip member may have an external surface contour at a proximal end that is adapted to be flush with an adjacent portion of the flange when the proximal end of the insert is secured in the first cavity.

In yet another aspect, a process for forming a cookware vessel may include (a) providing a metal flange having a curved inner face and an outer face, the curved inner face adapted to contact a curved outer wall of a cookware vessel, wherein a bore extends from the outer face toward the inner face; (b) providing an insert having a proximal end and a distal end, wherein the proximal end is adapted to be received in a portion of the bore that extends from the outer face toward the inner face of the flange, and wherein the distal end is adapted to extend away from the outer face of the flange when the proximal end is inserted in the bore at the outer face; (c) providing a grip portion comprising a polymeric material molded over the distal end of the insert and adapted to form a flush interface at an external periphery of the outer face of the flange when the proximal end is inserted into the bore; (d) inserting the proximal end of the metal insert into the bore of the flange at the outer face to bring the grip portion in contact with the outer face of the flange; (e) securing the proximal end of the insert to the flange within the bore; and (f) attaching the outer face of the flange to a curved outer wall of a cookware vessel to provide the grip molded as a handle for the cookware vessel.

In various embodiments, securing the proximal end of the insert to the flange within the bore may include welding the proximal end of the insert to the flange along an adjacent portion of the bore. In one embodiment, the handle for the cookware vessel is one of an elongated handle or a U-shaped handle. In another embodiment, the metal flange has first and second sides holes for receiving rivets that are disposed on opposing sides of the bore. Attaching the outer face of the flange to a curved outer wall of a cookware vessel to provide the grip molded as a handle for the cookware vessel may include (a) inserting a rivet through each of a first and a second hole in a sidewall of the vessel and corresponding first and second side holes in the flange, wherein a tail of each rivet extends beyond the respective side holes, and (b) deforming the distal end of the tail portion of each rivet extending beyond the respective side holes to secure the rivets, wherein the deformed distal ends of the tail portions extend beyond a periphery of each of the first and second side holes in the flange.

The above and other objects, effects, features, and advantages of the present invention will become more apparent from the following description of the embodiments thereof taken in conjunction with the accompanying drawings.

BRIEF DESCRIPTION OF THE DRAWINGS

Novel features of the present invention are set forth with particularity in the appended claims. However, the various embodiments of the present invention described herein, both as to organization and manner of operation, may be best understood by reference to the following description, taken in conjunction with the accompanying drawings in which:

FIG. 7A is a top plan view of another embodiment of the handle in which FIG. B and FIG. 7C are different cross-section elevation views taken along section lines 6B-6B (in FIG. 6C) and 6C-6C (FIG. 9A);

FIG. 9A is a side elevation view of the embodiment of FIG. 7A and FIG. 8A, wherein.

DESCRIPTION

Current techniques of over molding grips onto an obscured portion of a flange to fabricate handles for cookware articles, only work well with simple forged metal flanges having a simple shape and a generally flat grip portion. These simple shape limitations imposed by current techniques often lack grip comfort and aesthetic potential that allow users to distinguish cookware articles by ergonomic and stylistic differences. Moreover, the simple construction may contribute to a perception of low value for the entire cookware article. While a handle can be co-cast or molded with the flange, it is difficult to over mold, especially after the metal flange is trimmed and polished from the casting process. Molding after casting can also scratch the polished surface, and it is difficult to polish after molding, as polishing compound can become embedded at the margin of the molded plastic. The molded plastic can also be damaged. As cast and polished metal flanges for fabricating handles for cookware articles could be made in many shapes to create different utilitarian as well as aesthetic objectives, it would be beneficial to expand current technology to further these goals. According to various embodiments described herein, a composite cookware handle assembly for a cookware article may include a polished metal flange and a grip portion that extends to being flush with the margin of the flange, thereby giving the entire handle the appearance of a 3-dimensional casting.

Various embodiments of the inventive composite cookware handle assembly, components, and methods thereof are described herein with reference to FIGS. 1A-9C, wherein like reference numerals refer to like components in the various views.

Figure 1A:
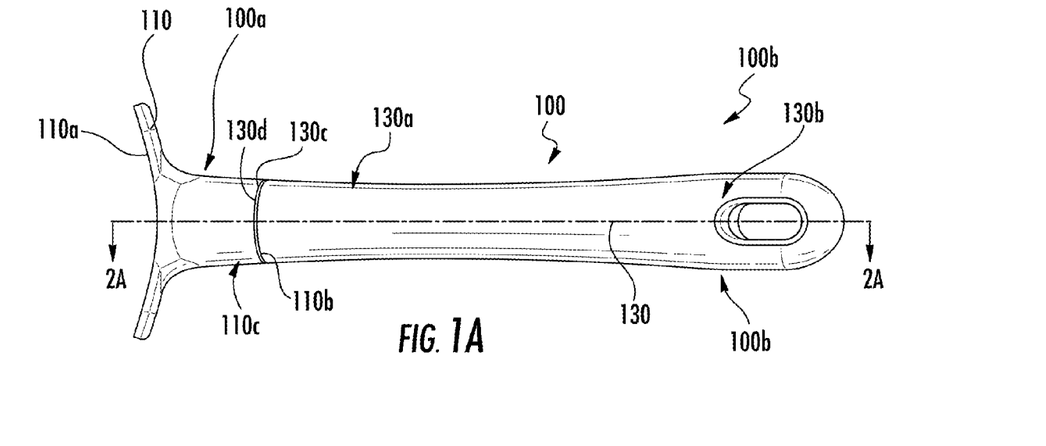
FIG. 1A is a top plan view of a handle for an article of cookware and FIG. 1B is an exterior elevation view thereof showing a portion of a cooking vessel.
Figure 1B:
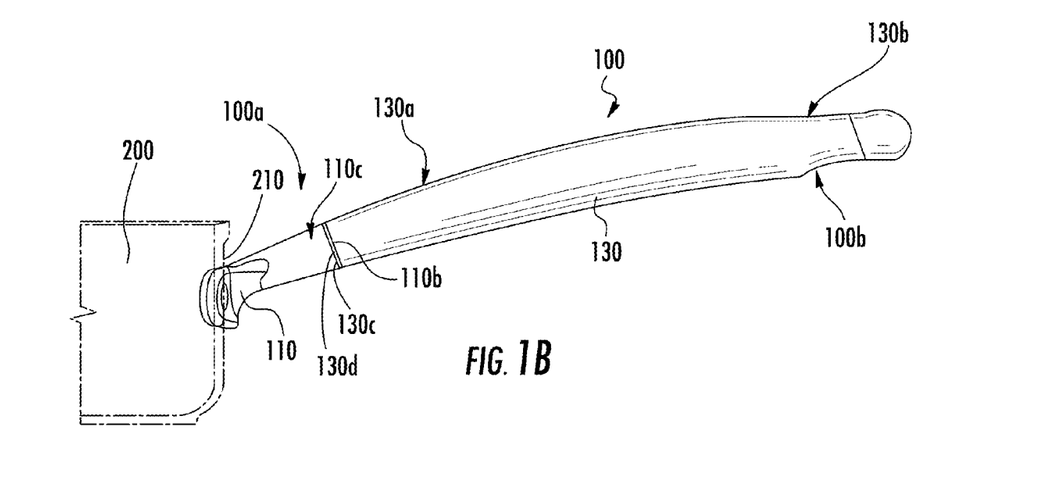

FIGS. 1A & 1B illustrate an elongate handle assembly 100 attached to a cooking article 200. The handle 100 includes a flange 110 located along a proximal end 100a that is adapted for attachment to the cooking article 200 (FIG. 1B). The flange 110 may generally include an inner face 110*a* adapted for contacting and mounting to an outer wall 210 of the cookware article 200. For example, the inner face 110*a* may have one or more complementary dimensions with respect to the wall 210, e.g., the dimensions may be adapted to approximate when interfaced, to allow flush mounting to the wall 210 along the complementary dimensions. In the illustrated embodiment, the inner face 110*a* has a curved profile dimensioned for contacting a correspondingly curved outer wall 210 of the cookware article 200.

The handle 100 further includes a grip member 130 located along a distal end 100*b* of the handle 100. The grip member 130 includes a proximal end 130*a* adjacent to the flange 110 and extends to a distal end 130*b*. An external surface contour 130*c* dimensioned to be flush with an adjacent portion 110*c* of the flange 110, such as an outer face 110*b* thereof, is defined by a proximal face 130*d* of the grip member 130. As introduced above, the flange 110 may include a polished metal flange 110. For example, the adjacent portion 110*c* or other visible portions may comprise polished metal.

Figure 2A:
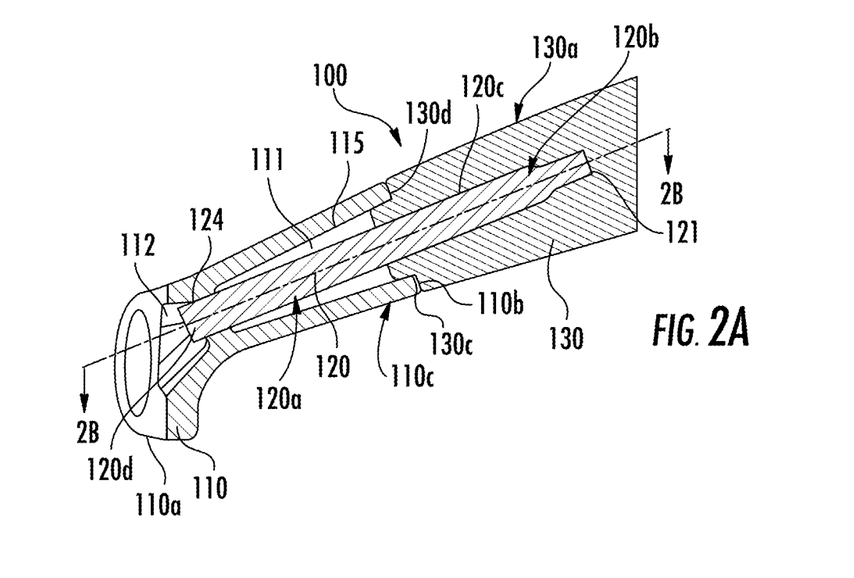
FIG. 2A is a cross-section elevated view of the handle taken along section line 2A-2A in FIG. 1A
Figure 2B:
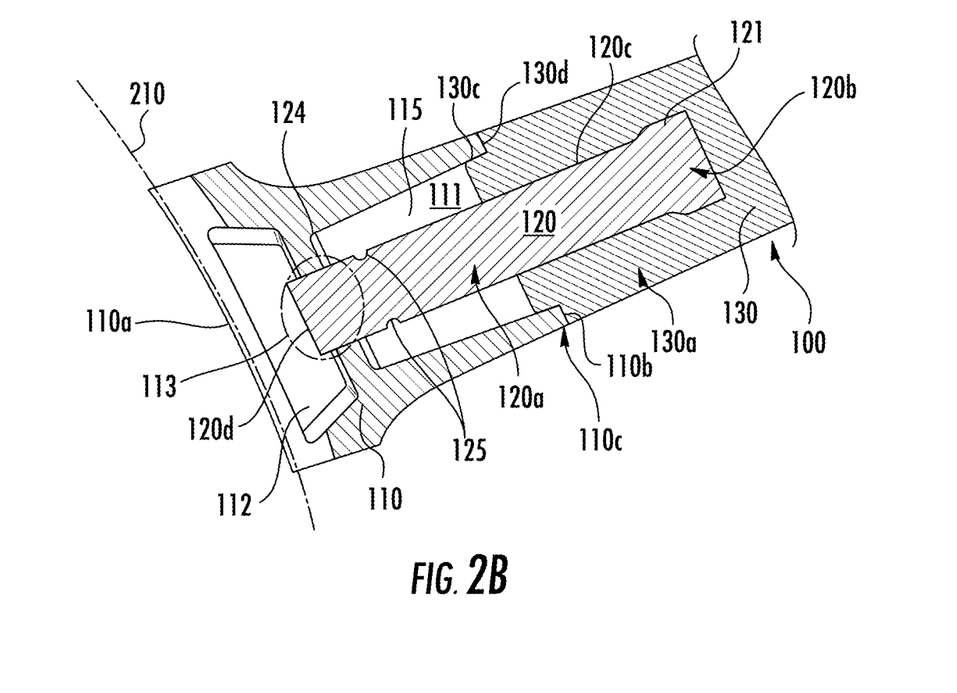
FIG. 2B is a cross-section thereof taken along section line 2B-2B in FIG. 2A.

With further reference to the cross-section views shown in FIGS. 2A & 2B, the handle 100 may also include an insert 120 positioned between the flange 110 and the grip member 130. The insert 120 may be adapted to be received by the flange 110 and therein in affixed to secured the insert 120 and hence the grip member 130 to the flange. The insert 120 includes include a proximal end 120*a* adapted to be inserted in the flange 110 and a distal end 120*b* adapted to be receive the grip member 130 along an exterior surface 120*c*. For example, the proximal end 120*a* may include one or more cross-section dimensions adapted to be received by the flange 110. The distal end 120*b* may include one or more cross-section dimensions adapted to underlay the grip member 130. In the illustrated embodiment, for example, the proximal end 120*a* has a generally consistent height dimension (see FIG. 2A) and a generally consistent width dimension (see FIG. 2B). The distal end 120*b* includes a tongue portion 121 having a reduced height dimension (see FIG. 2A) and an increased width dimension (see FIG. 2B). Other dimensions along the distal end 120*b* may also be used. For example, width dimensions along the distal end 120*b*, such as a tongue portion 121 thereof, may be greater or less than width dimensions along the proximal end 120*a*. Height dimensions along the distal end 120*b* may also be greater or less than width dimensions along the proximal end 120*a*. In one embodiment, the grip member 130 does not include a tongue portion 121 (see, e.g., FIGS. 3A & 3B). In some embodiments, height dimensions along the distal end 120*b* of the insert 120 may be similar to height dimensions along the proximal end 120*a*. For example, height dimensions along the proximal and distal ends 120*a*, 120*b* may be defined by generally planar upper and lower sides of the insert 120 (see, e.g., FIGS. 3A & 3B).

Figure 5A:
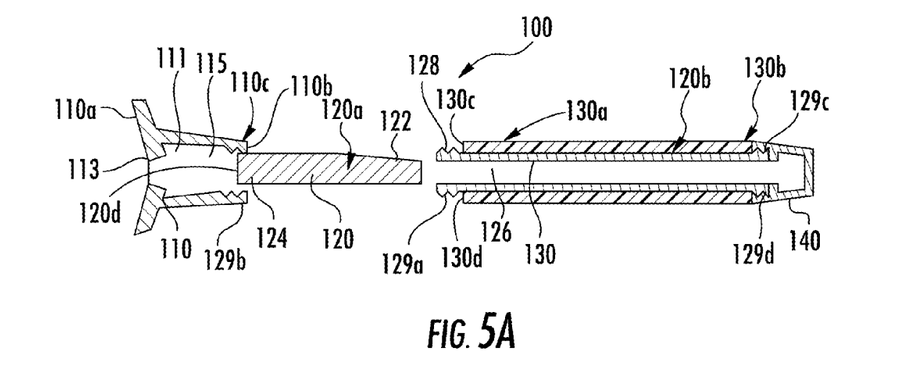
FIG. 5A is an cross-section plan view of the components use to fabricate another embodiment of a handle and cookware vessel, which is illustrated in FIG. 5B and FIG. 5C as a plan cross-section view and side cross-section elevation view.
Figure 5B:
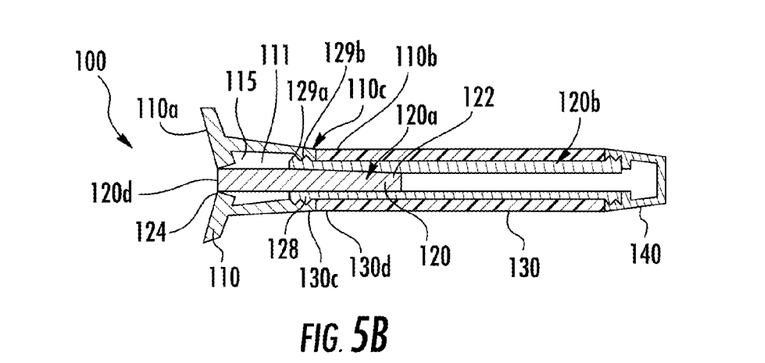
Figure 5C:
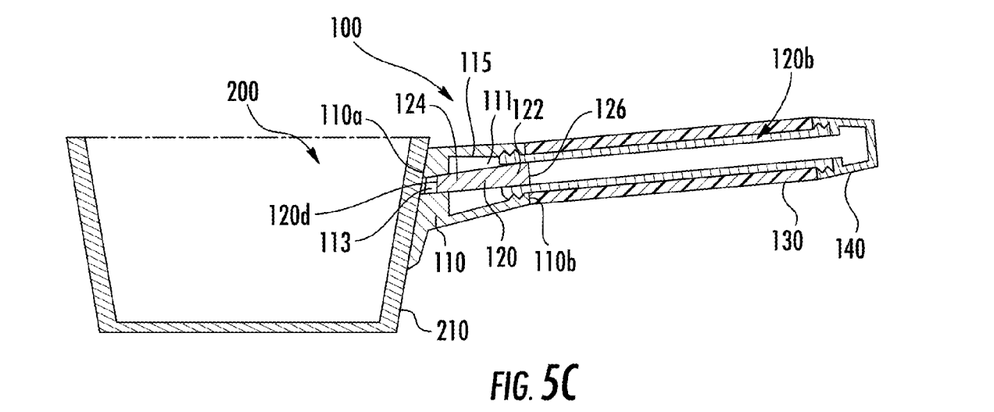

The flange 110 and insert 130 preferably comprise rigid materials, preferably metals, including alloys thereof. In some embodiments, the flange 110 or insert 130 may include metal portions, surfaces, or plating. As introduced above, the flange 110 may include a polished metal surface. The flange 110 or insert 130 may include solid metal construction or may be hollow. For example, the insert 120 may be solid or may include cavities, such as a pipe for a hollow handle, e.g., as shown in FIGS. 5A-5C. In various embodiments, the flange 110 may be partially hollow to receive the insert 120 and may have other hollow portions to minimize the total thermal capacity and weight, as well as to improve heat dissipation. For example, the flange 110 may define a bore 115 through which the insert 120 may be received. The bore 115 may typically extend between the outer face 110*b* and the inner face 110*a* and include at least a first cavity 111.

With continued reference to FIGS. 2A & 2B, the bore 115 extends from the outer face 110*b* to the inner face 110*a* of the flange 110. A portion of the flange 110 defining the bore 115 that extends inward from the inner face 110*a* defines a second cavity 112. The first cavity 111 is adjacent to the outer face 110*b* and the second cavity 112 is adjacent to the inner face 110*a*. The bore 115 further includes a channel 113 connecting the first cavity 111 and the second cavity 112. The channel 113 is narrowed relative to cavities 111, 112 includes a cross-section dimension less than a corresponding cross-section dimension of the cavities 111, 112 it connects.

The proximal end 120*a* of the insert 120 may include one or more cross-section dimensions adapted to extend into or through the reduced cross-section dimensions of the channel 113. When the insert 120 is received within the bore 115, the proximal end 120*a* of the insert 120 may extend through channel 113 and into the second cavity 112. Thus, a portion of the proximal end 120*a* of the insert 120, such as a proximal face 120*d*, may extend at least partially into the second cavity 112. However, in other embodiments, the proximal end 120*a* of the insert 120 may not extend into the second cavity 112 or the channel 113. In one example, the proximal end 120*a* of the insert 120 extends into the channel 113 but does not extend into the second cavity 112.

The insert 120 may be shaped to have cross-section dimensions to be received in the flange 110 in a manner that minimizes contact area to reduce heat transfer to the grip 130. Similarly, the flange 110 may define a bore 115 having cross-section dimensions, e.g., shaped, to receive the insert 120 in a manner that minimizes contact area between the flange 110 and the insert 120. For example, the insert 120 may make contact with only a portion of the flange 110 or bore 115 defined by the flange 110. In the embodiment illustrated in FIGS. 2A & 2B, the proximal end 120*a* of the insert 120 includes a cross-section dimensioned to fill the central channel 113.

In various embodiments, one or more cavities 111, 112 may have cross-section dimensions to adapted to provide space between the insert 120 and sidewalls defining the bore 115 when the insert 120 is received within the bore 115. For example, one or more lengths of cavities 111, 112 may include larger height or width dimensions than height or width dimensions along a corresponding length of the insert 120 to provide one or more continuous or discontinuous spaces (e.g., lateral, superior, or inferior pockets) between the insert 120 and the flange 110 within the bore 115. In the illustrated embodiment, for instance, the proximal end 120*a* of the insert 120 may make contact with only a narrow central channel 113 of the bore 115 separating the first cavity 111 from a second cavity 112 of the bore 115. In some embodiments, once affixed to the flange 110, the proximal end 120*a* of the insert 120 may contact the flange 110 only through an affixing member, such as a weld, rivet, screw, bayonet, or detent. In one embodiment, the proximal end 120*a* of the insert 120 contacts the flange 110 directly along the channel 113 and through an affixing member.

The grip member 130 may be over molded to cover at least a portion of an external surface 120*c* of the insert 120 along the distal end 120*b*. The grip member 130 may therefore comprise a molded material such as a polymeric material. The polymeric material may be molded from a resin material and include a plastic, thermoset polymer, elastomer or other polymeric material. In various embodiments, the grip member 130 comprises a high temperature stable phenolic resin. The grip member 130 is preferably shaped (preferably molded) to include external surface contour 130c along the proximal end 130a, e.g., along a proximal face 130d, that is adapted to be flush with an adjacent portion 110c of the flange 110 when the proximal end 110a of the insert 110 is received through the first cavity 111 and secured within the bore 115.

The proximal end 120a may be secured within the first cavity 111 by affixing the insert 120 to the flange 110. The insert 120 may be affixed to the flange 110 by a weld between the proximal end 120a and an adjacent portion of the flange 110 defining the bore 115, such as portions of the flange 110 defining the first cavity 111, second cavity 112, or channel 113. The weld may be a metallic weld between metal surfaces. Other manners of attachment may also be used. For example, the insert 120 may be affixed to the flange 110 via a rivet, screw, bayonet, or pronged detent mount. In the embodiment illustrated in FIGS. 2A & 2B, the proximal end 120a of the insert 120 includes a tab portion 124 having at least one cross-section dimension complementary to a corresponding cross-section dimension of the channel 113 to therein approximate or engage the channel 113 along the interface of the corresponding cross-section dimensions. More specifically, the tab portion 124 has a cross-sectional shape complementary to the cross-sectional shape of the channel to fill the channel 113 when inserted therein. The insert 120 may be affixed to the flange 110 via welds along an interface of the bore 115 and the channel 113 to the tab portion 124 or other portion of the proximal end 120a, such as to a perimeter of the tab portion 124 or proximal face 120d. The weld material may remain in the second cavity 112, and not extend beyond the proximal face 110a. However, to the extent welding residue may extend further, the welding material may be readily abraded or ground away, requiring no further finishing, as the second cavity 112 may abut the outer wall 210 of the cookware article 200 and be obscured when the handle 100 is attached thereto.

The proximal end 120a of the insert 120 illustrated in FIGS. 2A & 2B also includes one or more optional notches 125. In some embodiments, notches 125 may be adapted to securely engage a rod, such as a biased or spring loaded latch, (not shown) within the bore 115. In some such embodiments, the insert 120 may be inserted into the bore 115 and therein counter bias the rod. The insert 120 may then be further inserted, rotated, or otherwise manipulated to bias the rod into the notch 125. Once positioned in the notch 125, the may rod may prevent movement of the insert 120 from the first cavity 111. In other examples, a rod may be inserted through a side of the flange 110 into the bore 115 and into the notch 125. In some examples, the rod may extend completely though the proximal end 120a of the insert 120, the bore 115, or the flange 110.

Figure 3A:
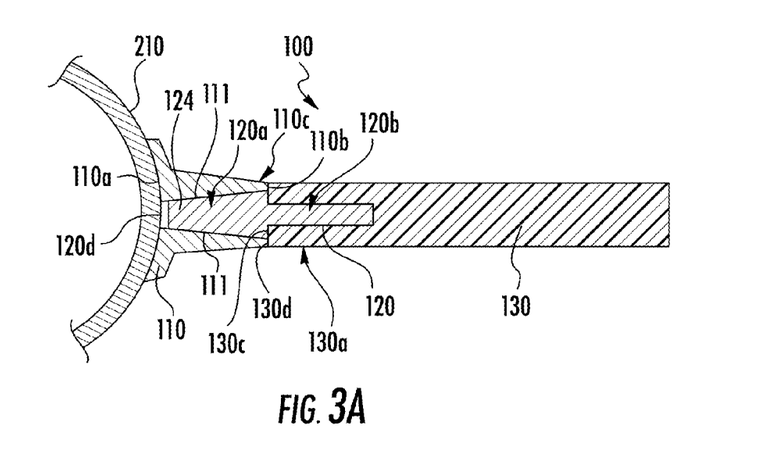
FIG. 3A and FIG. 3B are a plan cross-section view and a side cross-section elevation view, respectively, of an embodiment of the handle and cookware vessel.
Figure 3B:
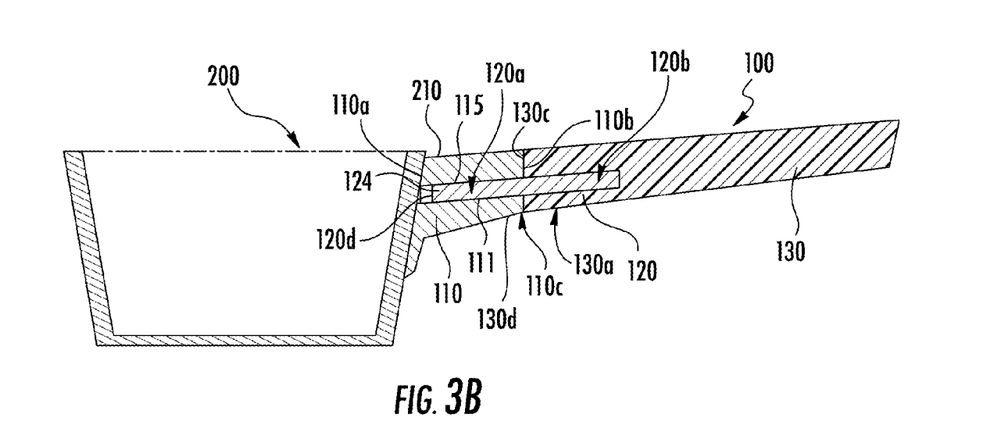

FIGS. 3A & 3B illustrate another embodiment of the handle 100 including a flange 110, insert 120, and grip member 130. The grip member 130 extends around at least a portion of the distal end 120b of the insert 120 and includes an external surface contour 130c along the proximal end 130a, e.g., proximal face 130d, that is adapted to be flush with an adjacent portion 110c of the flange 110 when the proximal end 110a of the insert 110 is received within the bore 115 and secured within the first cavity 111. In this embodiment, the insert 120 includes cross-section dimensions complementary to cross-section dimensions of corresponding portions of the bore 115. In particular, the insert 120 has a wedge shaped proximal end 120a having proximally decreasing width dimensions (see FIG. 3A) and generally consistent height dimensions (see FIG. 3B) along its length. The distal end 120b of the insert 120 may include generally consistent width and height dimensions along its length. The width dimensions along the distal end 120b may be less than the width dimensions along the proximal end 120a. The height dimensions along the distal end 120b may be similar to the height dimensions along the proximal end 120a. The height dimensions along the proximal and distal ends 120a, 120b may be defined by generally planar upper and lower sides of the insert 120.

Similar to the embodiment illustrated in FIGS. 2A & 2B, the bore 115 extends between the inner face 110a and the outer face 110b of the flange 110 and includes at least one cavity 111. When received within the bore 115, proximal translation of the insert 120 through the bore 115 may be limited by one or more cross-section dimensions of the proximal end 120a of the insert 120 relative to the bore 115. For example, the bore 115 may include complementary height and width dimensions with respect to the wedge shaped proximal end 120a of the insert 120 such that the proximal end 120a fills the bore 115 when received therein. The insert 120 may be affixed to the flange 110 by a weld between the proximal end 120a, e.g., along a perimeter of proximal face 120d, and an adjacent portion of the flange 110 defining the bore 115. The portion of the proximal end 120a welded to the flange may include a tab portion 124 having one or more complementary cross-section dimensions to engage the flange 110 at one or more of upper, lower, or lateral sides of the bore 115. Other manners of attachment may also be used. For example, the insert 120 may be affixed to the flange 110 via a rivet, screw, bayonet, or pronged detent mount.

Figure 4A:
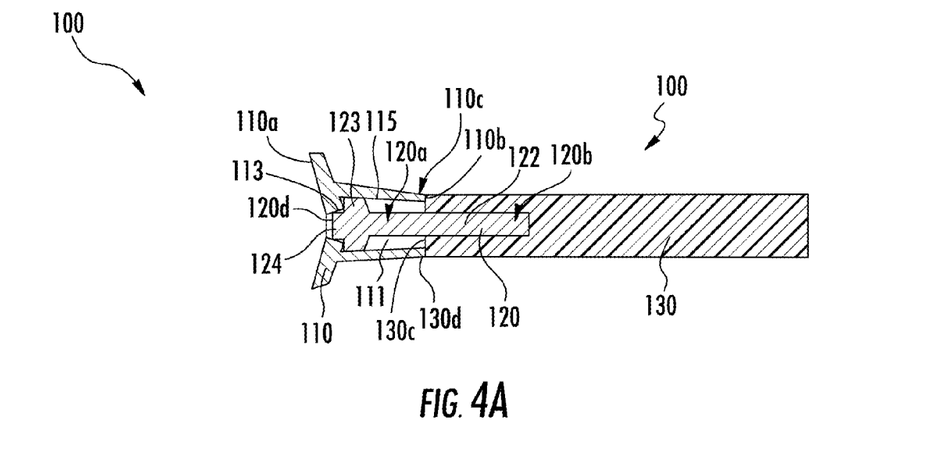
FIG. 4A and FIG. 4B are a plan cross-section view and a side cross-section elevation view, respectively, of an embodiment of the handle and cookware vessel.
Figure 4B:
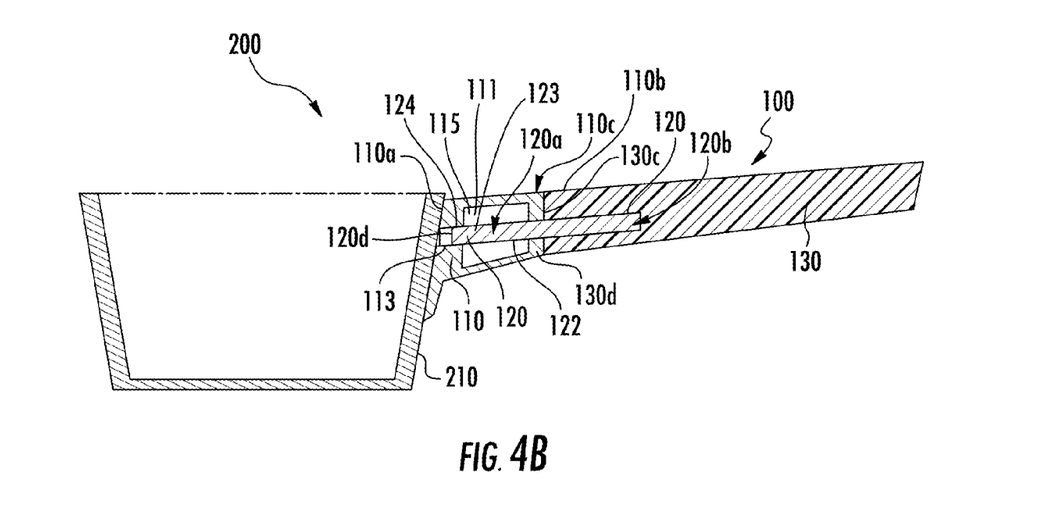

FIGS. 4A & 4B illustrates another embodiment of the handle 100 including a flange 110, insert 120, and grip member 130. The grip member 130 extends around at least a portion of the distal end 120b of the insert 120 and includes an external surface contour 130c along the proximal end 130a, e.g., proximal face 130d, that is adapted to be flush with an adjacent portion 110c of the flange 110 when the proximal end 110a of the insert 110 is in the bore 115 and secured within the first cavity 111. In this embodiment, the bore 115 extends between the inner face 110a and the outer face 110b of the flange 110 and includes at least one cavity 111. The cavity 111 has a proximally increasing width (FIG. 4A) and height (FIG. 4B). The bore 115 also includes a narrowed channel 113 that extends between the cavity 111 and the inner face 110a of the flange 110. Similar to the embodiments described above with respect to FIGS. 2A-3B, the proximal end 120a of the insert 120 includes cross-section dimensions including a generally consistent height dimension (see FIG. 4B) along its length, which in this embodiment may also be generally consistent along the entire length of the insert 120. The proximal end 120a of the insert 120 has a distal portion 122 having a generally consistent width dimension. The proximal end 120a also has a flared wedge portion 123, proximal to the distal portion 122, having a greater width dimension than the distal portion 122 (see FIG. 4A). Width dimensions of the flared wedge portion 123 also proximally increase along its length (see FIG. 4A). The width dimensions of the flared wedge portion 123 may be generally complementary to the width dimensions along a corresponding length of the bore 115. Thus, FIGS. 4A & 4B illustrate an embodiment of the handle 100 wherein the bore 115 and insert 120 include complementary proximal dimensions. The proximal end 120a of the insert 120 also includes a tab portion 124, proximal to both the distal portion 122 and flared wedge portion 123, having a reduced width dimension relative to the flared wedge portion 123. The tab portion 124 may have a greater width dimension than the distal portion of the proximal end 120a of the insert 120. In other embodiments, the tab portion 124 may have similar or smaller width dimensions than the distal portion 122.

As most clearly shown in FIG. 4A, when the insert 120 is received within the bore 115 of the flange 110, the lateral sides of the flared wedge portion 123 may wedge the insert 120 within the bore 111, obstructing distal translation and removal of the insert 120 from the bore 115. In various embodiments, the lateral sides of the flared wedge portion 123 may contact the flange 110 within the bore 115 or may be slightly spaced apart from the sides of the bore 115 such that distal translation of the insert 120 causes the lateral sides of the insert 120 along the flared wedge portion 123 to contact the flange 110 along the lateral sides of the bore 115. In some embodiments, the insert 120 may be removed distally from the bore 115 by rotating the insert 120 a sufficient degree to clear the lateral sides of the flared wedge portion 123 from the decreasing width of the bore 115. For example, the bore 115 may have cross-section dimension greater than the largest width of the flared wedge portion 123. Similar to the embodiment described above with respect to FIGS. 3A & 3B, proximal translation of the insert 120 through the bore 115 may be limited by one or more cross-section dimensions of the proximal end 120a relative to the bore 115. In the illustrated embodiment, a width dimension of the flared wedge portion 123 is greater than a width dimension of the channel 113, thereby obstructing reception of the flared wedge portion 123 into the channel 113 and, hence, further proximal translation of the insert 120 through the bore 115.

With continued reference to FIGS. 4A & 4B, channel 113 is dimensioned to receive tab portion 124. One or more cross-section dimensions of the channel 113 may also be complementary to corresponding dimensions of the tab portion 124 to thereby block movement of the tab portion 124 in one or more directions when received within the channel 113. In the illustrated embodiment, for example, the channel 113 and tab portion 124 have complementary height dimensions that prevent vertical movement of the tab portion 124 when received within the channel 113. The channel 113 and tab portion 124 may also include complementary width dimensions that prevent lateral movement of the tab portion 124 when received within the channel 113. For example, the tab portion 124 may be dimensioned to fill a length of the channel 113. However, as lateral movement of the proximal end 120a of the insert 120 within the bore 115 is obstructed by the complementary width dimensions along the corresponding portions of the cavity 111 and the flared wedge portion 123, in some embodiments, the channel 113 and tab portion 124 do not include complementary width dimensions. If insert 120 is to be affixed to the flange 110 by a weld between the tab portion 124, e.g., along the proximal face 120d or perimeter thereof, and an adjacent portion of the flange 110 defining the bore 115, e.g., along the channel 113, it may be desirable that width dimensions along the proximal face 120d complement or approximate the width dimensions of the corresponding portion of the channel 113 to increase available weld points. In one such example, space between the lateral sides of the tab portion 124 and flange 110 may be provided within the channel 113, distal to the proximal face 120d. As described above, other manners of attachment may also be used. For example, the insert 120 may be affixed to the flange 110 via a rivet, screw, bayonet, or pronged detent mount thereby securing the proximal end 120a within the first cavity 111. In one embodiment, an attachment member is not used and the insert 120 is obstructed from vertical, lateral, proximal, and distal movement due to the dimensional fitment of the proximal end 120a of the insert 120 and the bore 115, as described above.

Similar to the embodiment described above with respect to FIGS. 2A & 2B, space within the bore 115, in particular, cavity 111 of the embodiment illustrated in FIGS. 4A & 4B, is provided between the insert 120 and the flange 110 when the proximal end 120a of the insert 120 is received within the bore 115 and secured within the first cavity 111. In particular, the proximal end 120a of the insert 120 is spaced apart from the flange 110 the within the cavity 111 along the lateral, superior, and inferior sides of the distal portion 122 and the superior and inferior sides of the flared wedge portion 123. The space around the distal portion 123 may be continuous. Accordingly, the distal portion 122 and two or more sides of the flared wedge portion 123 may not contact the flange 110 or bore 115, reducing thermal conduction of heat therebetween.

FIGS. 5A-5C illustrates another embodiment of the handle 100 wherein the handle includes a two piece insert 120 comprising a proximal end 120a and distal end 120b. The proximal end 120a of the insert 120 is dimensioned to be received within a cavity 126 extending within the distal end 120b. The grip member 130 extends around the distal end 120b and includes an external surface contour 130d along the proximal end 130a, e.g., proximal face 130d, that is adapted to be flush with an adjacent portion 110c of the flange 110 when the proximal end 110a of the insert 110 is received in the bore 115 and secured within the first cavity 111. Similar to the embodiments described above, the flange 110 illustrated in FIGS. 5A-5C defines a bore 115 that extends from the outer face 110b toward the inner face 110a and includes at least a first cavity 111. The bore 115 also includes a narrowed channel 113 dimensioned to receive tab portion 124 of the insert 120 in a manner and with accompanying structure similar to that described with respect to FIGS. 4A & 4B. For example, the relative cross-section dimensions, e.g., height or width dimensions, of the tab portion 124 and channel 113 may be configured such that the tab portion 124 engages or approximates one or more cross-section dimensions of the channel 113 along an interface. As a result, movement of the proximal end 120a of the insert 120 within the channel 113 may be obstructed in one or more of proximal, lateral, or vertical directions when the tab portion 124 is located within the channel 113. In one example, the cross-sectional shape and dimensions of the tab portion 124 are complementary to a corresponding the cross-section of the channel 113 such that the tab portion 124 may fill the channel 113. In one embodiment, the proximal end 120a of the insert 120 may be affixed to the flange 110 via welding at an interface along the proximal face 120b and channel 113, e.g., interface of tab portion 124 and channel 113. Other attachment members may also be used, such as those described elsewhere herein.

The illustrated handle 100 is configured to compress the proximal end 120a of the insert 120 toward the channel 113 to thereby affix the insert 120 and retain the tab portion 124 along the proximal end 120a within the channel 113. In one embodiment, channel 113 extends to an opening along the inner face 110a and the tab portion 124 is obstructed from proximal movement by the outer wall 210 of the cookware article 200. In another embodiment, the bore 115 may not extend to or include an opening at the inner face 110a of the flange 110 and the tab portion 124, and hence the proximal end 120a of the insert 120, may be obstructed from proximal movement by a base of the bore 115. In still another embodiment, the channel 113 may include a proximal length having a dimension less than a corresponding dimension of the tab portion 124 that prevents proximal movement of the tab portion 124 beyond the proximal length. Similarly, the tab portion 124 may include a distally increasing dimension configured to wedge within the channel 113, preventing further proximal movement. In still yet another embodiment, the proximal end 120a may include a portion, distal to the tab portion 124, having a larger dimension than a corresponding dimension of the channel 113, such as the flared wedge portion 123 described above with respect to FIGS. 4A & 4B, that prevents the portion from entering the channel 113 and hence further proximal movement of the proximal end 120a of the insert 120.

With continued reference to FIGS. 5A-5C, the distal end 120b of the insert 110 may be adapted to engage and couple the flange 110 and thereby at least partially affix the insert 120 to the flange 110. For example, the distal end 120b of the insert 110 may include proximal mating structures 129a configured to mate with mating structures 129b disposed along the flange 110. Examples mating structures may include rails, grooves, compression fitments, snap fitments, slots, notches, or other suitable structures. In the illustrated embodiment, the mating structures 129a, 129b include threads disposed along a proximal portion 128 of the distal end 120b of the insert 120 and the outer face 110b of the flange 110, where the proximal portion 128 of the distal end 120b of the insert 120 comprises the male connector and the outer face 110b of the flange 110 comprises the female connecter. In another embodiment, the proximal portion 128 of the distal end 120b of the insert 120 may comprise the female connector and the outer face 110b of the flange 110 may comprise the male connecter.

The extent the proximal end 120a may be received within the hollow portion of the distal end 120b may be limited by a dimension along the proximal end 120a that is greater than the corresponding dimension of hollow portion. For example, a rod or other type of stop may extend into the hollow portion and abut the proximal end 120a, preventing additional distal translation of the proximal end 120a within the cavity 126. In the illustrated embodiment, the proximal end 120a includes a distal portion 122 having at least one distally increasing dimension configured to wedge within the cavity 126 of the hollow portion at a predetermined location corresponding to the engagement of the flange 110 and grip 130 and the limitation of proximal movement of the proximal end 120a through the bore 115. It will be appreciated that the proximal end 120a may also include a hollow portion.

The handle 100 illustrated in FIGS. 5A-5C also includes an optional screw cap type closure 140, which can optionally house and seal electronic components, either in the removal cap or closure 140 or the cavity 126 that it accesses. As shown, the distal end 120b includes distal mating structures 129c configured to mate with mating structures 129b disposed along the closure 140. Example mating structures may include rails, grooves, compression fitment, snap fitment, slots, notches, or other suitable structures. In the illustrated embodiment, the mating structures 129c, 129d include threads, where the distal mating structures 129c disposed along the distal end 120b of the insert 120 comprises the male connector and the mating structures 129d disposed along the closure 120 comprise the female connecter. In another embodiment, the distal mating structures 129c may comprise the female connector and the mating structures 129d of the closure 140 may comprise the male connecter.

In various embodiments, the insert 120 may include mating structures disposed along a another portion of the insert 120, e.g., a medial portion, and the proximal end 120a may be received within the bore 115 of the flange 110 and therein be proximally compressed, as described herein, when the mating structures are mated with corresponding mating structures disposed on the flange 110. The handle 100 described with respect to FIGS. 5A-5C illustrates one such example. In a modified embodiment, the proximal and distal ends 120a, 120b of the insert 120 described with respect to FIGS. 5A-5C may comprise a single structural unit. In such an example, one or both of the proximal end 120a or distal end 120b may or may not include a hollow portion. In another embodiment, the handle 100 may be similar to the embodiment described with respect to FIGS. 5A-5C but without the proximal end 120a of the insert.

Figure 6A:
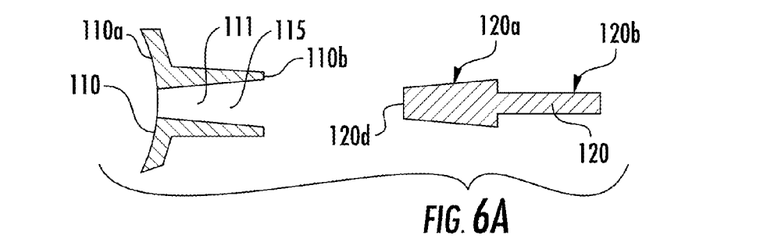
FIGS. 6A-6E are plan cross-section views the formation of a handle and method of attachment to the cookware article according to various embodiments.
Figure 6B:
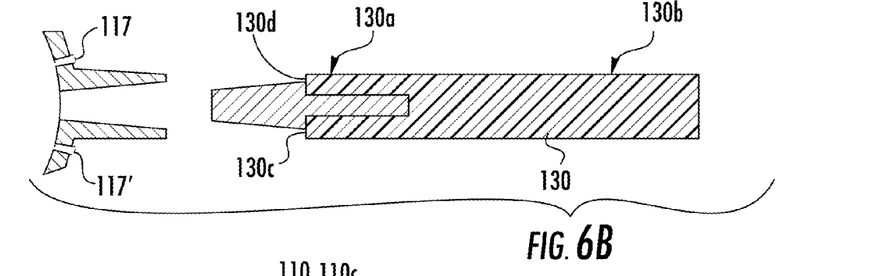

FIGS. 6A-6E illustrate an embodiment of the handle 100 and assembly and attachment of the handle 100 to a cookware vessel 200 according to various embodiments. FIG. 6A illustrates the flange 110 and insert 120 of the handle 100 prior to the proximal end 120a of the insert 120 being received within the bore 115 of the flange 110 (FIG. 6C) and the distal end 120b of the insert 120 being over molded with the grip member 130 (FIG. 6B). FIGS. 6B-6E illustrate the components of assembly in FIG. 6A being transformed to provide handle 100 attached to cookware vessel 200.

The handle 100 assembled in FIGS. 6A-6E may be similar to the handle 100 described above with respect to FIGS. 3A & 3B. In one embodiment, a method of assembling the handle 100 for the cookware vessel 200 may include providing the flange 110 (FIG. 6A), wherein the flange 110 defines a first curved inner face 110a adapted for contacting a curved outer wall 210 of the cookware vessel 200 (see, e.g., FIG. 6E) and an outer face 110b that opposes the inner face 110a. The bore 115 may extend from the outer face 110b to the inner face 110a. The method may further include providing the elongated insert 120 (FIG. 6A) having a proximal end 120a adapted to be received in the portion of the bore 115 of the metal flange 110 that extends from the outer face 110b toward the inner face 110a, and a distal end 120b attached to or otherwise extending distally from the proximal end 120a that is adapted to extend away from the distal end 110b of the flange 110 when the proximal end 120a is inserted in the bore 115 of the metal flange 110 at the outer face 110b.

As shown in FIG. 6B, a polymeric grip member 130 may be molded over the distal end 120b of the insert 120 and include an external surface contour 130c along a proximal face 130d that is adapted to form a flush interface at the external periphery of the outer face 110b of the flange 110 when the proximal end 120a of the insert 120 is inserted into the bore 115. As is also shown in FIG. 6B, the flange 110 may include first and second sides holes 117, 117' for receiving affixing members, such as rivets 217 (see, e.g., FIG. 6D). The side holes 117, 117' may be disposed on opposing sides of the bore 115. In various embodiments, side holes 117, 117' may be drilled, punched, molded, or otherwise formed through the flange 110.

Figures 6C, 6D:
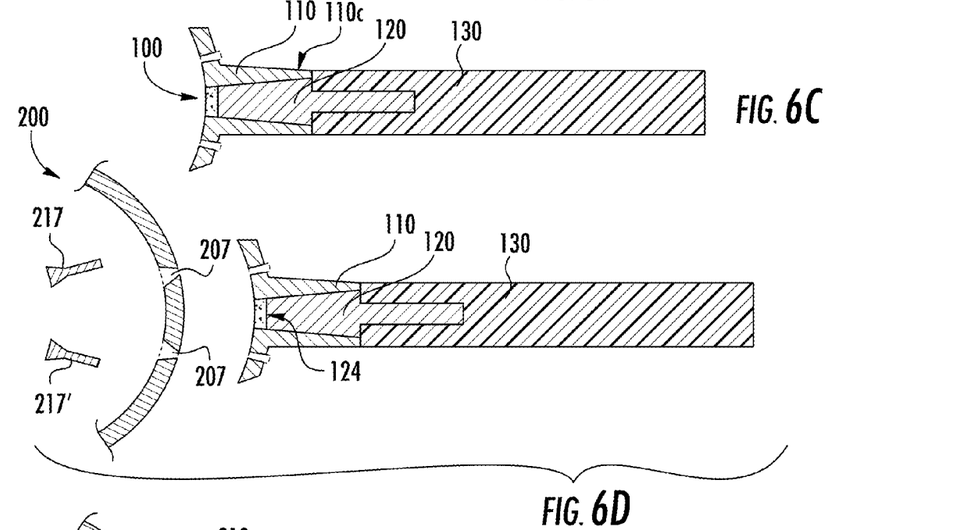

The proximal end 120a of the insert 120 may be inserted into the bore 115 of the flange 110 at the outer face 110b, as shown in FIG. 6C, to bring the grip member 130 into contact with the outer face 110b of the flange 110. When received within the bore 115, the insert 120 may be affixed to the flange 110 to secure the proximal end 120a within the cavity 111, as shown in FIG. 6D. For example, the proximal end 120*a* of the insert 120 may be welded to an interior portion of the flange 110 disposed between the proximal and distal faces 110*a*, 110*b* of the flange 110. As shown, the proximal face 120*d* along tab portion 124 or perimeter thereof comprising metal surfaces are welded to interfacing or adjacent metal surfaces along the narrowed proximal length of the bore 115. The insert 120 may also be affixed to the flange 110, e.g., within bore 115, as described elsewhere herein.

Figure 6E:
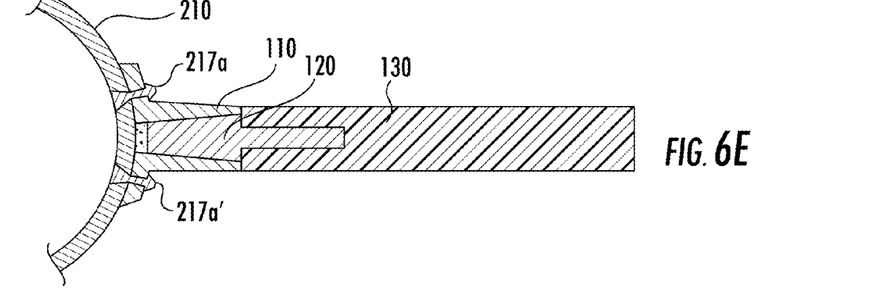
Figure 7A:
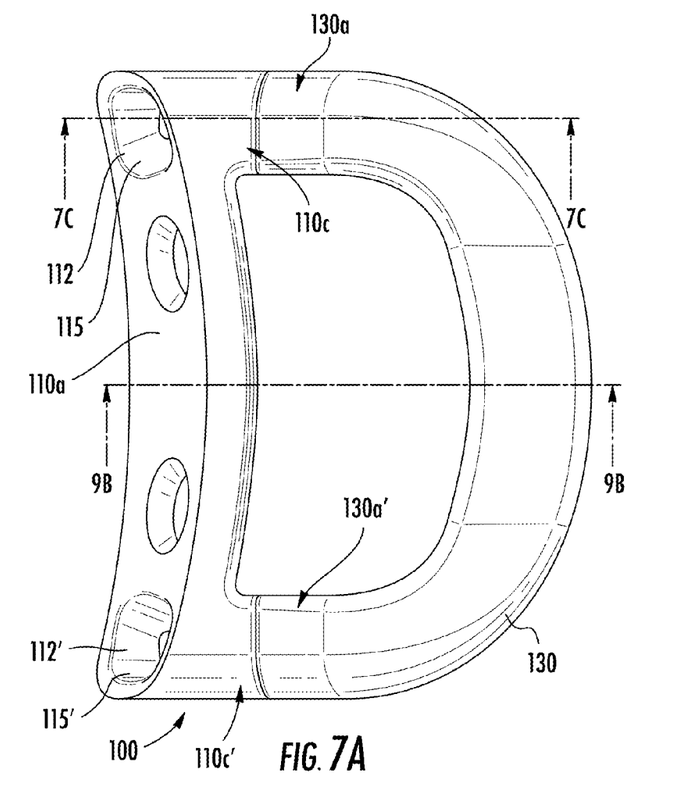
Figures 7B, 7C:
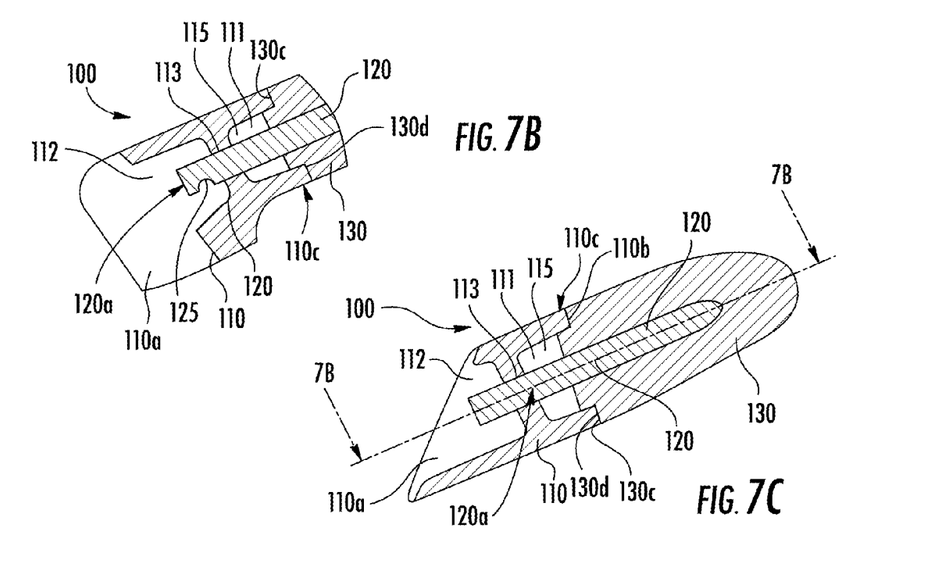
Figure 8A:
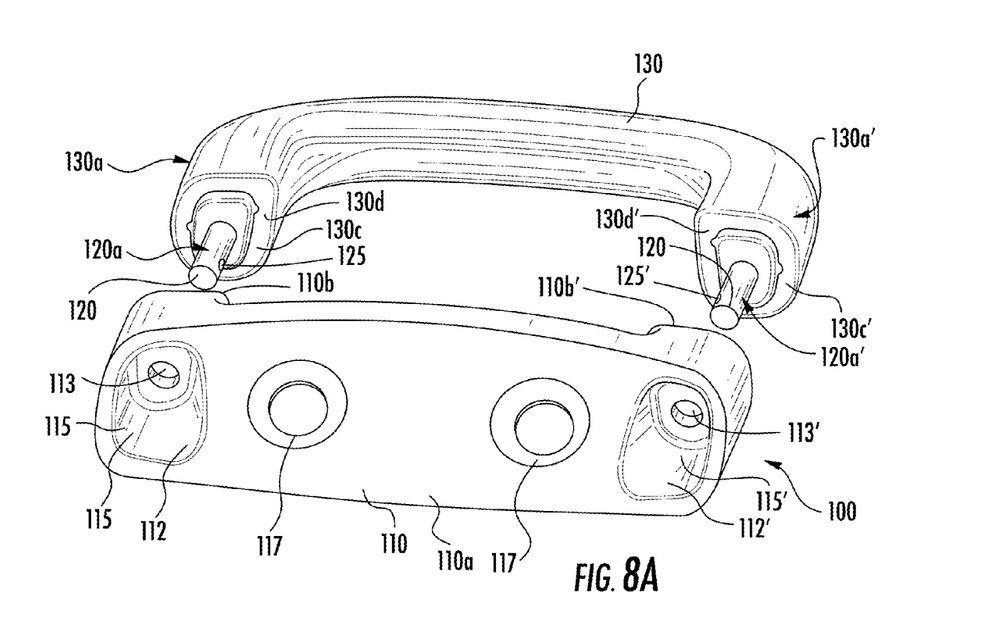
FIG. 8A is a perspective view of the flange and grip component of the embodiment of FIG. 7A-7C prior to attachment and FIG. 8B is after attachment.
Figure 8B:
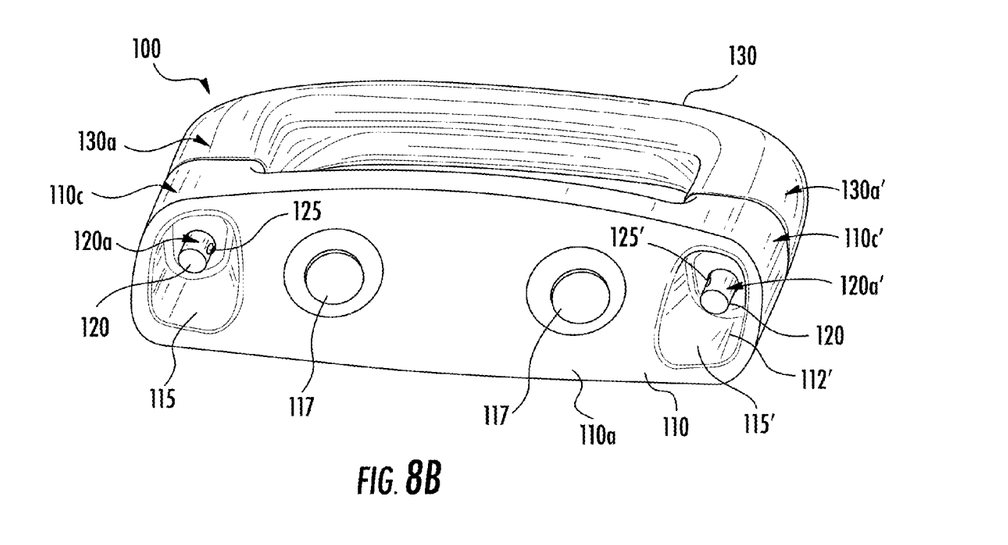

FIG. 6D along with FIG. 6E illustrate steps of attachment of the handle 100 to the cookware vessel 200. In particular, the inner face 110*a* of the flange 110 may be secured to a curved outer wall 210 of the cookware vessel 200 to provide the grip member 130 molded as a handle for the cookware vessel 200. More specifically, a rivet 217, 217' may be inserted through a hole 207, 207' in a sidewall 210 of the vessel 200 that is opposite each of the first and second side holes 117, wherein a tail portion 217*a*, 217*a*' of the rivet 217, 217' extends beyond each side hole 117. In some embodiments, a distal end of the tail portion 217*a*, 217*a*' of each rivet 217, 217' may be deformed to extend beyond a periphery of each of the first and second side hole 117, 117' in the flange 110.

As introduced above, the handle 100 may be configured to provide various shaped grip members 130. For example, in various configurations, grip members 130 may be generally straight or linear, curved, U-shaped, bulbous or L shaped for a long handle, helper handle, lid handle, or short side handle. In these and other embodiments, the insert 120 may extend the entire length of the grip member 130 or only a portion of the grip member 130. In some embodiments, the insert 120 may be shorter than the grip member 130 (see, e.g., FIGS. 3A-4B). In certain embodiments, the grip member 130 may extend more distally from the flange 110 than the insert 120 (see, e.g., FIGS. 2A-4B). In other embodiments, the insert 120 may extend more distally from the flange 110 than the grip member 130 (see, e.g., FIGS. 5A-5C).

FIGS. 7A-9C illustrate various views of a handle 100 having a U-shaped grip member 130 according to various embodiments. With particular reference to the views in FIG. 7A and FIG. 8B, the U-shaped grip member 130 may include two proximal ends 130*a*, 130*a*' adapted to dispose along outer faces 110*b*, 110*b* of the flange 110. With further reference to the exploded view in FIG. 8A, the proximal ends 130*a*, 130*a*' of the grip member 130 include external surface contours 130*c*, 130*c*' adapted to be flush with adjacent portions 110*c*, 110*c*' of the flange 110 when the proximal ends 120*a*, 120*a*' of the insert 120, 120' are received into respective bores 115, 115' and affixed thereto.

The proximal ends 120*a*, 120*a*' of the insert 120 and respective bores 115, 115' defined by the flange 110 illustrated in FIGS. 7A-9C may be structured similar to that described above with respect to FIGS. 2A & 2B. For example, with continued reference to FIGS. 8A & 8B and with further reference to the cross-section views shown in FIGS. 7B & 7C, each bore 115, 115' may extend between the outer face 110*b*, 110*b*' and the inner face 110*a* of the flange 110 and include at least a first cavity 111, 111'. A portion of the flange 110 defining each bore 115, 115' that extends inward from the respective inner face 110*a*, 110*a*' may define a second cavity 112, 112'. Each bore 115, 115' may further include a narrowed channel 113, 113' connecting the respective first cavity 111, 111' and second cavity 112, 112'. Each channel 113, 113' may include a cross-section dimension less than a corresponding cross-section dimension of the respective cavities 111, 111', 112, 112' it connects. The proximal ends 120*a*, 120*a*' of the insert 120 may also be dimensioned to extend into or through the reduced dimensions of the respective channel 113, 113'. The proximal ends 120*a*, 120*a*' of the insert 120 may be welded or otherwise secured with attachment members to the flange 110, as described herein.

Although not employed in the illustrated embodiment, the proximal ends 120*a*, 120*a*' of the insert 120 each include one or more optional notches 125, 125'. As introduced above, notches 125, 125' may be adapted to engage a rod, such as a biased or spring loaded latch, (not shown) within the bore 115, 115'. In some such embodiments, the insert 120 may be inserted into the bore 115, 115' and therein counter bias the rod. The insert 120 may then be inserted further into the bore 115, 115' to bias the rod into the notch 125, 125'. Once positioned in the notch 125, 125', the rod prevents movement of the insert 120 from the first cavity 111, 111'. A rod may also be inserted through one or more sides of the flange 110 into the bore 115, 115' and into the notch 125, 125'. In some examples, the rod may extend completely though the proximal end 120*a*, 120*a*' of the insert 120, the bore 115, 115', or the flange 110.

In other embodiments, U-shaped handles 100 may be configured with inserts 120 and flanges 110 as described elsewhere herein, such as with respect to FIGS. 3A-6E.

Figure 9A:
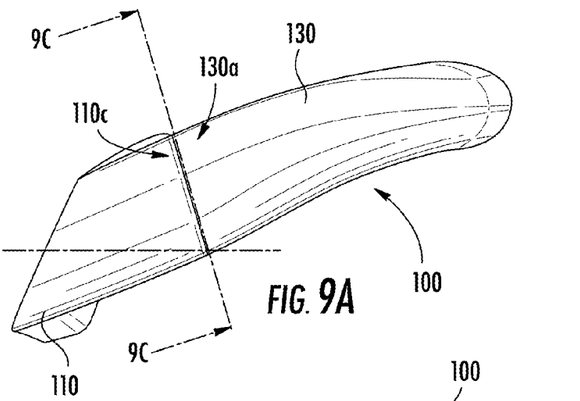
Figures 9B, 9C:
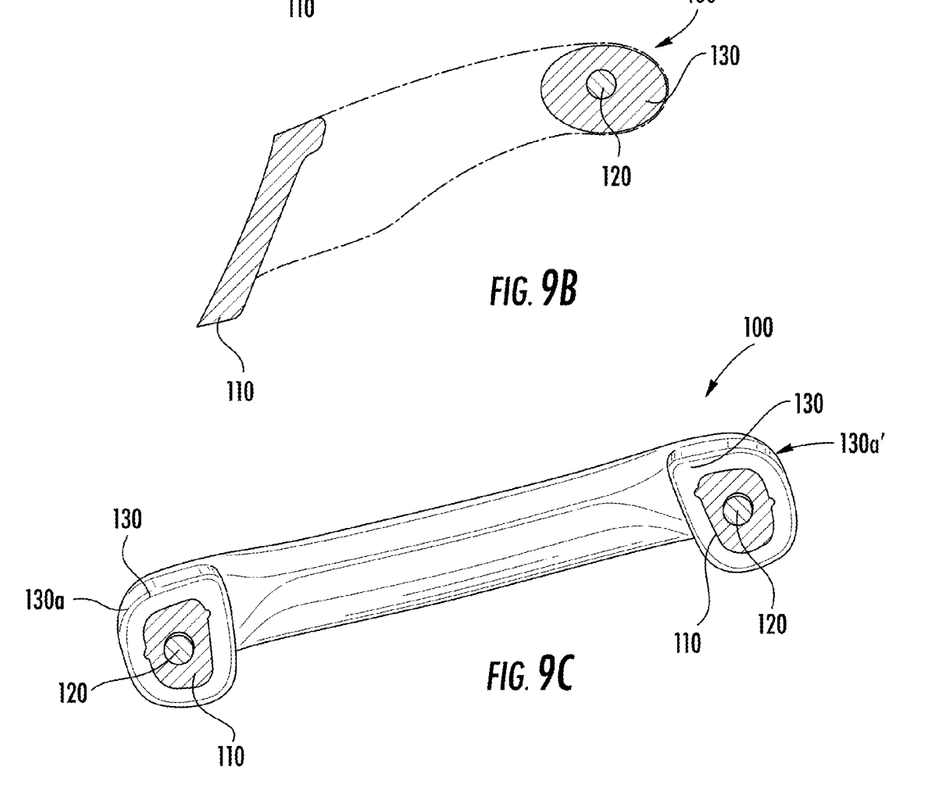
FIG. 9B is a cross-section elevation view taken along section line 9B-9B in FIG. 7A.
FIG. 9C is a cross-section elevation view taken along section line 9C-9C in FIG. 9A.

As illustrated in FIG. 9A and the cross-section views provided in FIGS. 9B & 9C, the insert 120 may extend the entire length of the grip member 130 and into the corresponding bores 115, 115' of the flange 110 to provide secure attachment of the grip member 130 at the flange 110. The flange 110 may be suitably secured to a wall of a cookware article, e.g., using rivets through holes 117, 117' and corresponding holes in an outer wall of the article, e.g., as described with respect to FIGS. 6A-6E, to provide a handle 100 for the article wherein the flange 110 and grip member 130 engage to provide a flush interface.

The disclosed handle, including handle assemblies thereof, described herein may provide improved handles and cookware articles comprising such handles. For example, embodiments of the handle may enable the use of cast metal flanges with molded resin grips. Metal finishing may also be completed before attachment of the molded handle to reduce labor and defects that may otherwise occur if the finishing of the exposed metal was completed after over molding of resin grips. The herein described handle may also provide aesthetic improvement of a finished metal component being flush with the molded handle at their mutual external edge. The handle may optionally be configured with a lighter weight assembly compared to solid metal handles of similar shape and may further reduce potential for vessel tipping as the mass of the handle may be located closer to the vessel center of gravity. In contrast to forged over molded metal handles, which contact the entire vessel sidewall and are exposed to combustion gas exiting the pan, the inventive handle assembly can be maintained at a lower temperature as less heat is transferred to the grip portion as the area of contact with the flange can be minimized to the weld area, or other attachment area.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims. For example, as introduced above, the insert may be secured within the bore, e.g., within the first cavity, and may be welded or otherwise affixed to the flange along the bore. In one such embodiment, the insert may be affixed to the flange at a non-visible portion before attachment or molding of the grip member to the insert.

It will be appreciated that while various features have been described with terms such as lateral, superior, inferior, width, height, and the like, such terms are words of convenience and are not to be construed as limiting terms unless indicated otherwise. Such terminology used herein is not meant to be limiting insofar as the handles described herein, or portions thereof, may be attached or utilized in other orientations. For example, in some embodiments, features may be rotated such that height becomes width and lateral becomes superior and inferior.

What is claimed is:

1. A handle assembly for a cookware article comprising:
   (a) a metal flange having an inner face and an outer face, the inner face adapted for contacting a curved outer wall of a cookware article, wherein a bore extends from the outer face toward the inner face and defines at least a first cavity therebetween;
   (b) an insert having a proximal end and a distal end, wherein the proximal end is received within the first cavity of the bore and secured therein when the proximal end is affixed to the flange within the bore; and
   (c) a grip member having a proximal end and a distal end and comprising a polymeric material over molded at least a portion of the distal end of the insert, the grip member having an external surface contour at a proximal end that is flush with an adjacent portion of the flange when the proximal end of the insert is secured in the first cavity.

2. The handle assembly for a cookware article according to claim 1, wherein the proximal end of the insert has a metal tab portion having a cross-section dimension complementary to a cross-section dimension of the bore, wherein the metal tab portion engages the bore along the corresponding complementary cross-section dimension of the bore when received therein, and wherein the proximal end is affixed to the flange along the engaged interface of the metal tab portion and the bore by a weld.

3. The handle assembly for a cookware article according to claim 2, wherein the bore defines a channel extending proximally from the first cavity toward the inner face of the flange, the channel having at least one cross-section dimension smaller than a cross-section dimension of the first cavity, and wherein the complementary cross-section dimension of the bore is located along the channel.

4. The handle assembly for a cookware article according to claim 1, wherein the bore extends from the outer face to the inner face of the flange, and wherein the first cavity is adjacent to the outer face and the bore defines a second cavity adjacent to the inner face.

5. The handle assembly for a cookware article according to claim 4, wherein the proximal end of the insert comprises a metal tab portion that extends at least partially into the second cavity, and wherein the metal tab portion is affixed to a portion of the bore defining the second cavity by a weld.

6. The handle assembly for a cookware article according to claim 1, wherein the bore defines a channel extending between the first cavity and a second cavity, the channel having at least one cross-section dimension smaller than a cross-section dimension of the first cavity, and wherein a length of the proximal end of the insert is adapted to fill at least a portion of a length of the channel when the proximal end of the insert is secured within the first cavity.

7. The handle assembly for a cookware article according to claim 1, wherein the bore defines a channel extending proximally from the first cavity toward the inner face of the flange, the channel having at least one cross-section dimension smaller than a cross-section dimension of the first cavity, and wherein a length of the proximal end of the insert and a length of the channel comprise complementary cross-sections such that the length of the proximal end of the insert fills the length of the channel when the proximal end of the insert is secured with the first cavity.

8. The handle assembly for a cookware article according to claim 1, wherein, when the proximal end of the insert is secured in the first cavity, a length of the proximal end within the first cavity is spaced apart from the surrounding portions of the flange defining the first cavity.

9. The handle assembly for a cookware article according to claim 1, wherein the bore defines a channel extending proximally from the first cavity toward the inner face of the flange, the channel having at least one cross-section dimension smaller than a cross-section dimension of the first cavity, and wherein the proximal end of the insert comprises:
   (a) a metal tab portion having at least one cross-section dimension complementary to a cross-section dimension of the channel;
   (b) a flared wedge portion, distal of the metal tab portion, having a distally decreasing cross-section adapted to complement a distally decreasing cross-section of the first cavity along a corresponding length of the bore when the proximal end of the insert is secured in the first cavity; and
   (c) a distal portion, distal of the flared wedge portion, wherein the distal portion has a cross-section dimension less than the corresponding cross-section dimension of flared wedge portion along the distally decreasing cross-section, and wherein the distal portion is space apart from surrounding portions of the bore defining the first cavity when the proximal end is secured therein.

10. The handle assembly for a cookware article according to claim 1, wherein a proximal length of the distal end of the insert defines a cavity adapted to receive a distal length of the proximal end of the insert.

11. The handle assembly for a cookware article according to claim 10, wherein the outer face of the flange includes mating structures adapted to mate with mating structures disposed along the proximal length of the distal end of the insert, wherein the proximal end of the insert is compressed between the flange and the distal end of the insert when the proximal end of the insert is secured in the first cavity.

12. The handle assembly for a cookware article according to claim 11, wherein the mating structures disposed along the proximal length of the distal end of the insert are proximal of the grip member.

13. The handle assembly for a cookware article according to claim 11, wherein the mating structures comprise threads adapted for screwing the distal end of the insert to the distal face of the flange.

14. The handle assembly for a cookware article according to claim 10, wherein the distal end of the insert further defines a cavity along a distal portion thereof, and wherein the handle assembly further comprises a cap closure having mating structures adapted to mate with mating structures disposed along the distal portion of the distal end of the insert to enclose the cavity.

* * * * *